J. P. RANDERSON.
AUTOMOBILE FENDER.
APPLICATION FILED JAN. 20, 1910.
968,800.
Patented Aug. 30, 1910.
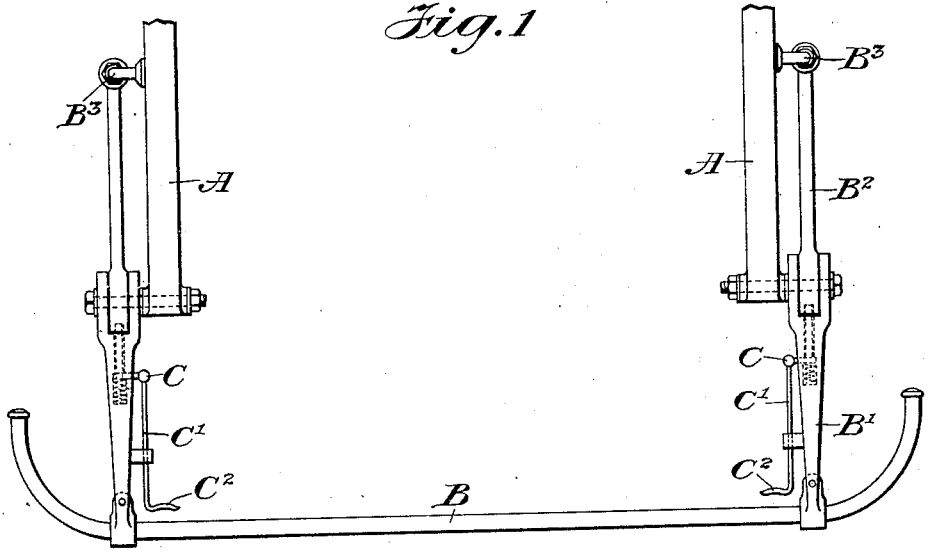
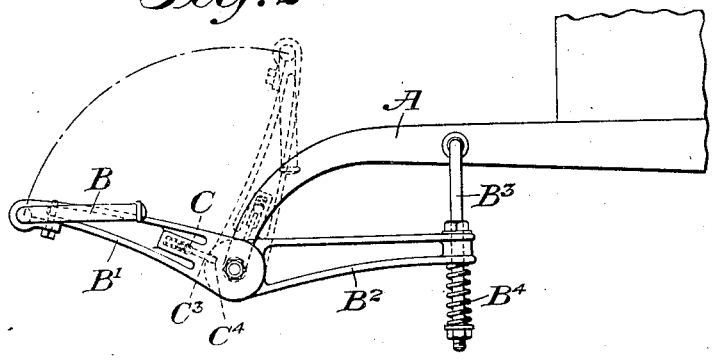
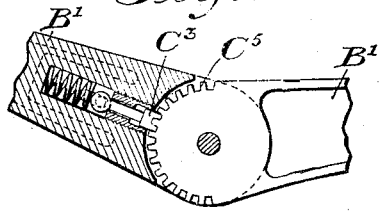
WITNESSES:
Chas. F. Clagett
G. C. Allman
INVENTOR
John P. Randerson
BY T. J. Johnston,
his ATTORNEY

UNITED STATES PATENT OFFICE.

JOHN P. RANDERSON, OF ALBANY, NEW YORK.

AUTOMOBILE-FENDER.

968,800.

Specification of Letters Patent. Patented Aug. 30, 1910.

Application filed January 20, 1910. Serial No. 539,126.

*To all whom it may concern:*

Be it known that I, JOHN P. RANDERSON, a citizen of the United States, and a resident of Albany, in the county of Albany and State of New York, have made certain new and useful Improvements in Automobile-Fenders, of which the following is a specification.

My present invention relates to automobile guards or fenders, and especially to those which act as spring buffers, and prevent injury to the machine in case of unexpected stoppage of another vehicle, running the machine too close to the rear of a vehicle in front of it, backing of such a vehicle while the automobile is unattended, or the like. The particular embodiment shown in this case illustrates a well-known form of fender consisting of a bar across the front of the machine, supported from the framework by bell-crank arms pivoted at the bend thereof, and having a spring under the rear arm of the bell-crank, which acts to take up the shock of minor collisions, as referred to above. An objection to this type has been that it is necessary to climb over the fender to crank the machine; particularly with large and powerful engines, this is often laborious and sometimes impracticable unless the operator can stand directly over the crank. Stepping over the guard is always inconvenient and sometimes dangerous, as when the clutch hangs the machine may start and trap the operator, who could easily escape if the guard were out of the way; it is also objectionable to women, and especially in public.

To avoid the difficulties set out, I hinge the front of the fender at the elbows of the bell-crank arms, and provide the joint with a pin which is spring-pressed into a hole, preferably tapered, in the stationary member of the joint; rods extend from the pins to handles located near the front bar of the fender, by means of which the pins (one of which is provided for each joint) may be withdrawn from their sockets, after which the front-bar is turned up and back against the radiator, so that it is entirely out of the way. When it is desired to restore the fender to its working position, it is simply turned down, whereupon the pins drop into their sockets by the pressure of the springs.

In a modified form, the fender is made adjustable to various heights.

The accompanying drawings show an embodiment of my invention.

Figure 1 is a plan, and Fig. 2 is a side elevation, of a fender constructed according thereto. Fig. 3 is a sectional detail of the modification referred to.

In Figs. 1 and 2, A is the frame of the machine; B is the front-bar of the fender, supported from the frame by the bell-cranks, the forward arms of which are lettered $B^1$, the rear ones $B^2$; the rear arms are supported by the bolt $B^3$, carrying the spring $B^4$, which serves to cushion the device. The two arms $B^1$ $B^2$ are jointed at the elbow, and are held in relative position by the pin $C^3$, having the handle C and pressed into place by a spring, as shown. Extending from the pin to the front-bar is a rod $C^1$, which near the bar is formed into or has attached thereto a handle $C^2$; the pin is fitted to a hole $C^4$, preferably tapered, as described.

In Fig. 3, the pin $C^3$ is shown provided with a toothed head, fitting into a rack $C^5$, formed on the stationary arm of the bell-crank; by this means the forward arm of the crank may be adjusted at various angles, so as to give the fender various elevations, as will be manifest.

When it is desired to raise the fender, the operator grasps the front-bar and the handles $C^2$ at the same time, thus releasing the pins; whereupon the bar may be raised to the position shown in dotted lines in Fig. 2, where it will remain until it is desired to return it to the operating position shown in Fig. 1. If the construction shown in Fig. 3 is employed, it will of course be necessary to release the pins whenever the device is operated in either direction; but obviously, in Figs. 1 and 2 it may be lowered without doing so, as the spring will press the pins into their sockets.

Having thus described my invention, what I claim and wish to protect by Letters-Patent of the United States is:—

1. As a new article of manufacture, an automobile fender comprising a front-bar carried by bell-crank arms pivoted together, a spring cushion for the fender, and means for holding the arms of the bell-crank rigid or permitting them to move relatively, as described.

2. As a new article of manufacture, a fender for automobiles comprising a front-bar, bell-crank arms pivoted together a spring-pressed pin carried by one of the arms, a socket in the other arm into which the pin may pass, and a handle for the pin, as described.

3. As a new article of manufacture, an automobile fender comprising a front-bar, arms carrying the bar, the arms being pivoted together, a cushioning spring, a securing device for holding the arms in one or more positions, as desired, and means for releasing them, as described.

4. In an automobile fender, the combination of the front-bar, the bell-crank arms pivoted together and provided with a cushioning spring, a pin for securing the arms to one another, a rod extending from the pin to a position near the front-bar, and a handle on the end of the rod; whereby the fender may be released and turned up by a single motion, and may be returned to its place as desired.

In witness whereof I have hereunto set my hand in the presence of two witnesses.

JOHN P. RANDERSON.

Witnesses:
Jos. A. Lawson,
Duncan Douglas.